4 Sheets—Sheet 1.
T. WOOD.
MACHINE FOR MAKING NAILS AND SPIKES.
No. 100,230. Patented Feb. 22, 1870.
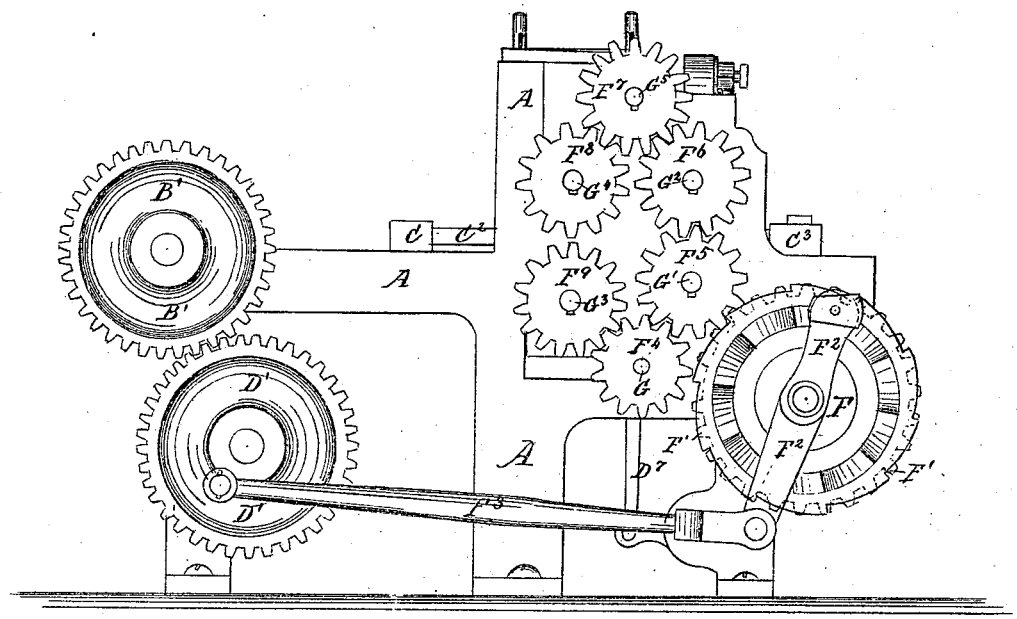
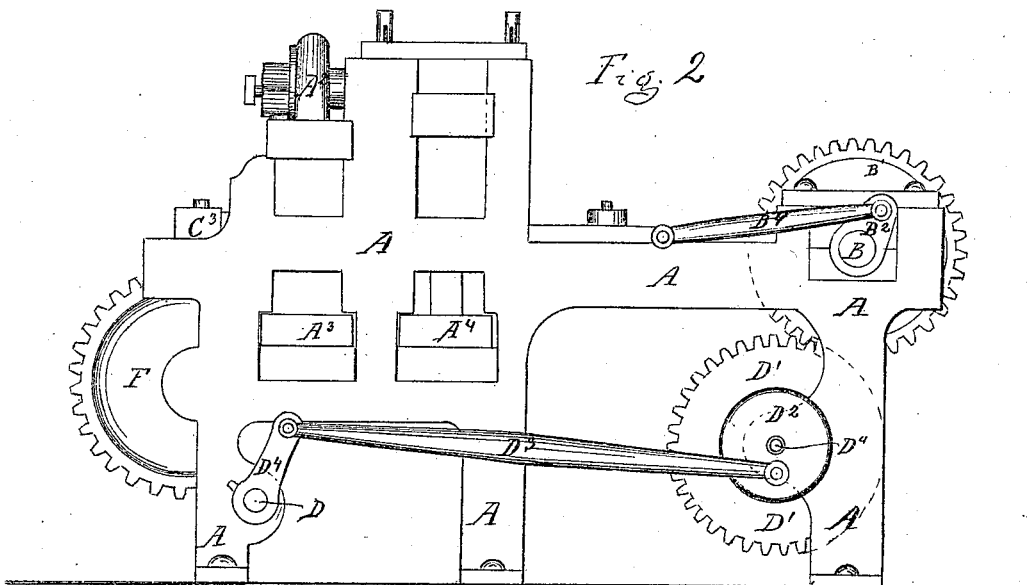

4 Sheets—Sheet 2.
T. WOOD.
MACHINE FOR MAKING NAILS AND SPIKES.
No. 100,230.      Fig. 3      Patented Feb. 22, 1870.
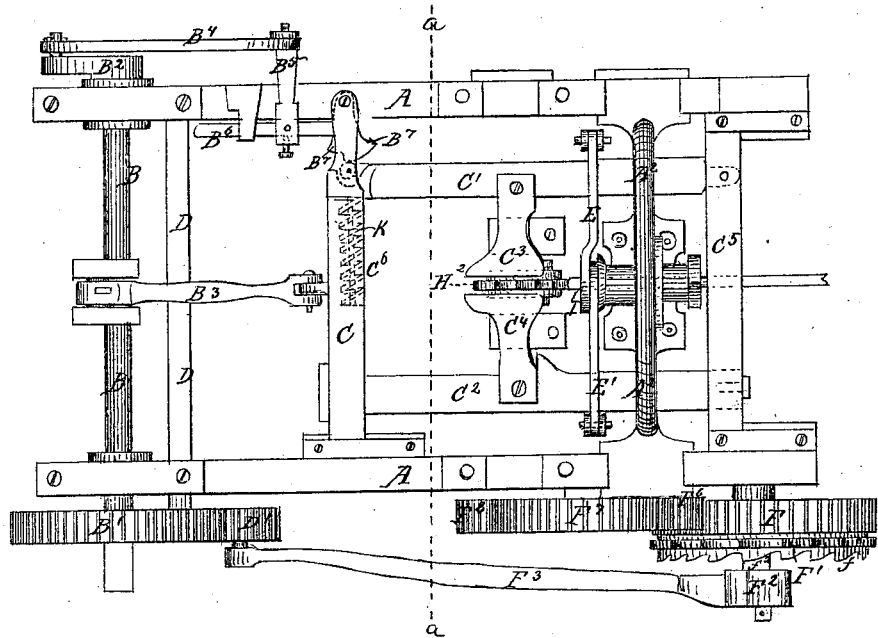
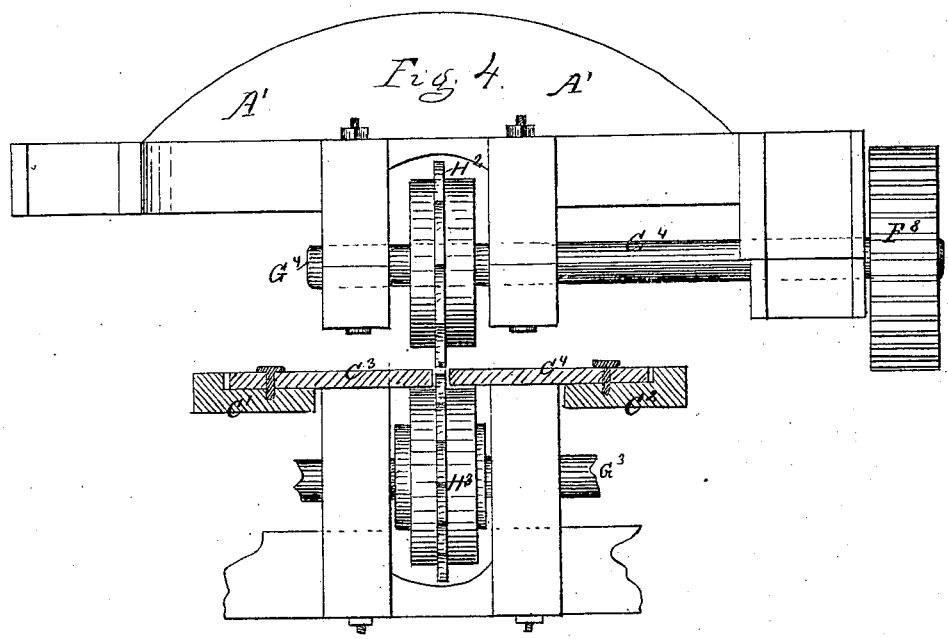
Witnesses          Inventor

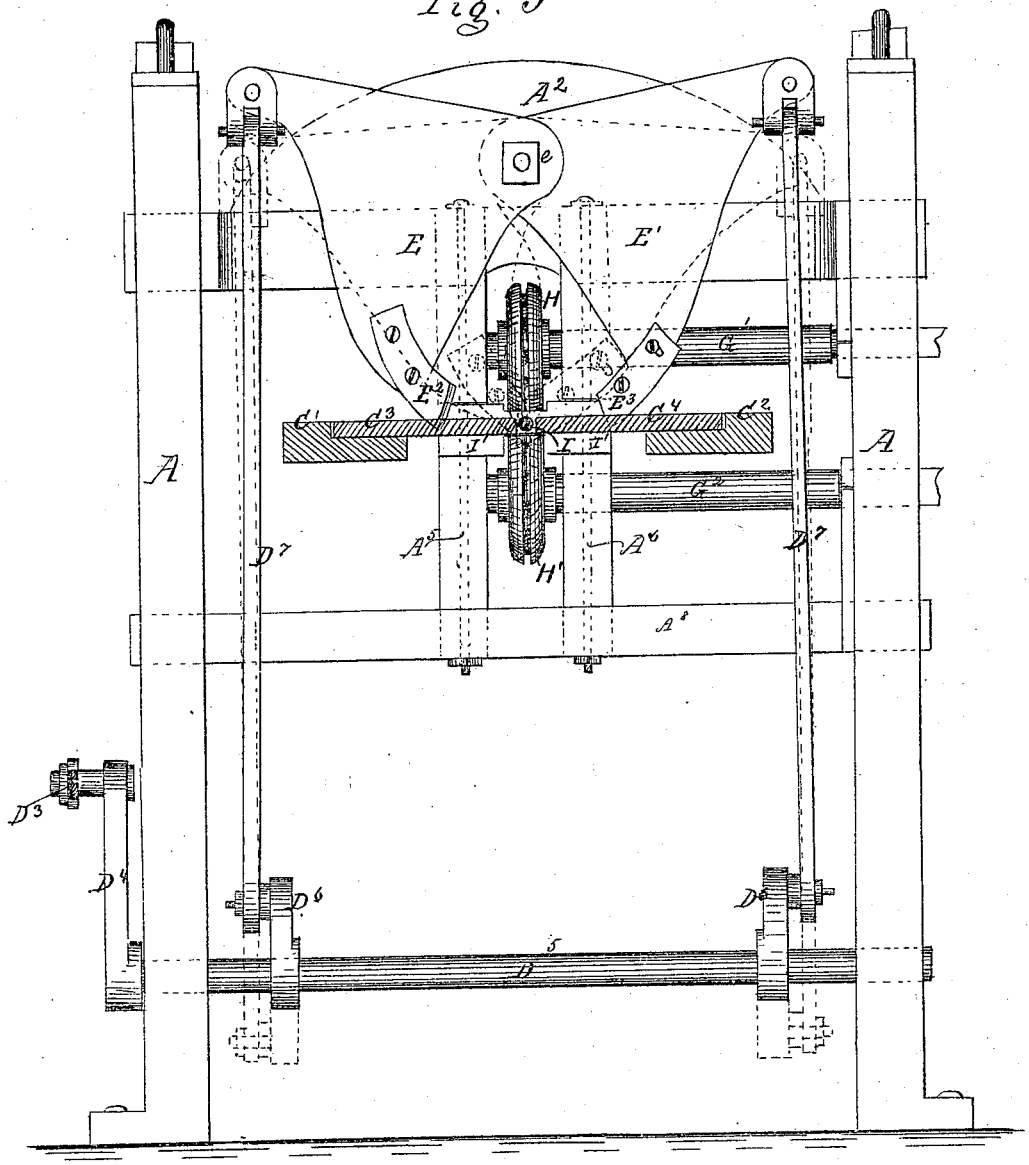

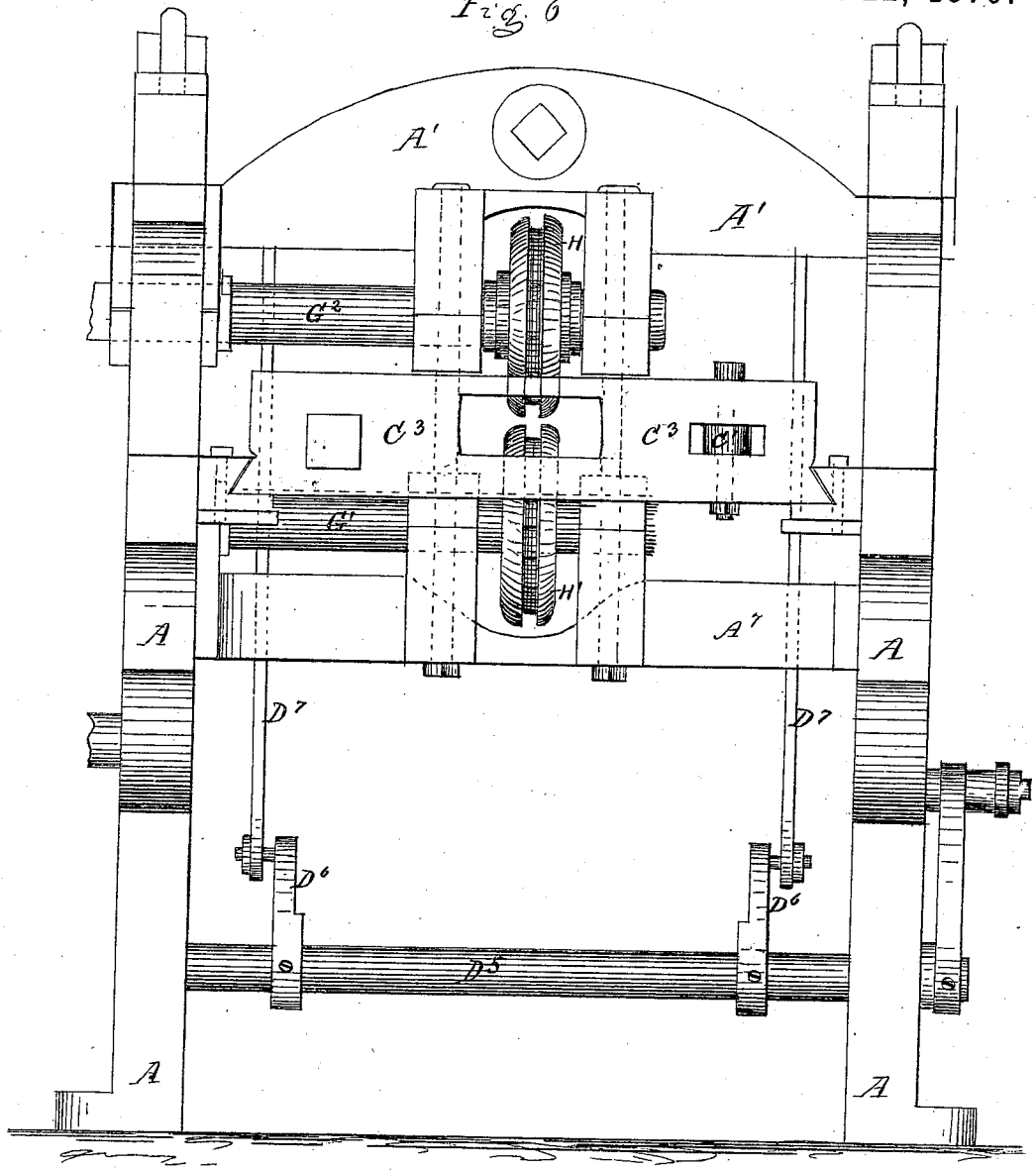

United States Patent Office.

THOMAS WOOD, OF MATTEAWAN, NEW YORK.

Letters Patent No. 100,230, dated February 22, 1870.

IMPROVED MACHINE FOR MAKING NAILS AND SPIKES.

The Schedule referred to in these Letters Patent and making part of the same.

*To all whom it may concern:*

Be it known that I, THOMAS WOOD, of Matteawan, in the county of Dutchess, and State of New York, have invented certain Improvements in Spike and Nail-Machines; and I do hereby declare that the following is a full, clear, and exact description thereof, reference being had to the annexed drawings making part of this specification, in which—

Figure 1 is an elevation of the left-hand side of the machine viewed from the front end, showing the driving-gears, connecting-rod, pawl, and ratchet-wheel for giving motion to the rollers which form the spikes or nails.

Figure 2 is an elevation of the right-hand side viewed from the same point, showing the frame of the machine, the position of the rollers, and the rod for giving motion to the shears which sever the spikes or nails from the rod or bar of iron from which they are to be formed.

Figure 3 is a plan or top view of the machine, showing the crank which moves the sliding jaws, the position of such jaws with reference to the finishing rollers, the shears for cutting the spikes from the bar, the devices for moving the jaws, and various other parts.

Figure 4 is a detached view of a portion of the framework, showing the position of the finishing rolls.

Figure 5 is a vertical transverse section on line *a a* of fig. 3, showing the shears and the mechanism for operating them, together with the first or introducing rolls and the guide through which the spike or nail is passed to the finishing rolls.

Figure 6 is a front elevation of the machine, showing an end view of the frame which carries the sliding jaws, with its aperture through which the rod or bar is passed to the introducing rolls, and a portion of the mechanism for operating the shears.

The same letters are used in all the figures in the designation of identical parts.

This invention relates to that class of machines which is used for making spikes or nails by rolling or compressing the blanks cut from a bar or rod of suitable size into a matrix or mold formed in the peripheries of a series of rollers, and thus bringing them into the desired form.

In machines of this class as heretofore constructed it has been usual to attempt to form the spike or nail with one pair of rolls and at a single operation. But this has been found to be a very objectionable plan, for the reason that the labor has been so severe that the rolls soon became worn out, or their forms became altered to such an extent that a renewal thereof was necessary, thus causing much expense, and delay as well as the production of an imperfect article. Another and very serious objection has arisen from the fact that the sides or surfaces of spikes and nails made in such machines were roughened in leaving the matrix to such an extent as to make it necessary that a largely-increased amount of force should be applied in order to cause them to enter the wood.

The present invention is designed to obviate the objections above referred to, and to this end it consists—

First, in combining and arranging two or more sets of rollers in such a manner that a portion of the operation of forming a spike or nail shall be performed by each pair of such rolls, and successively, while the said spike or nail remains within the control of some one pair of the rolls.

Secondly, it consists in providing jaws which grasp and move the spike or nail at a greater rate of speed than the surface of the rollers, in which the matrices or molds are formed, moves, for the purpose of causing a smooth surface to be formed upon said spikes or nails.

Thirdly, it consists in combining and arranging other portions of the machine, as will be more fully set forth hereinafter.

The following description will enable persons skilled in the art to construct and operate my improved machine.

In the annexed drawings—

A is the main frame of the machine, suitably constructed to afford the requisite support for the bearings of the various portions of the operating mechanism.

B is the main driving-shaft to which the power is applied, turning in journal-boxes on the end of the main frame, and carrying upon one end the driving-pinion $B^1$, and upon the other the crank $B^2$.

It has in the middle a double crank, to the wrist of which is attached a pitman, $B^3$, which drives the reciprocating jaws, to be hereinafter described.

Another pitman, $B^4$, connects the crank $B^2$ with an arm, $B^5$, adjustably attached by a set-screw to the reciprocating rod $B^6$, sliding through guides attached to the main frame, and being pivoted to the oscillating cam $B^7$, which is pivoted at the outer end to the end of the cross-head C, and placed within a chamber or slot formed in the end of said cross-head, its inner eccentric face bearing against the end of the oscillating bar $C^1$, to which is attached the movable jaw $C^3$.

The face of the cam, as it oscillates, presses forward the jaw $C^3$ as it moves in one direction; and, as it moves in the other, the jaw is forced back by the pressure of the spring $C^6$ bearing upon the end of the bar $C^1$.

The opposite end of the bar $C^1$ is pivoted to the cross-head $C^5$, which, as well as the cross-head C, slides on ways upon the main frame.

Opposite to the oscillating bar $C^1$ is a parallel bar, $C^2$, which is rigidly connected to the cross-heads C and $C^5$, the four parts C, $C^1$, $C^5$, and $C^2$ forming a reciprocating frame carrying the jaws, and actuated by the pitman $B^3$. A stationary jaw, $C^4$, is attached to the bar C². Said parts are so arranged that as the pitman B³ is thrown forward, the pitman B⁴, thrusting the cam in the same direction, shall permit the jaws to open, and so remain until the return-stroke causes the jaws to close upon the nail or spike to be operated upon, and draw it forward for purposes to be explained; and as the cranks turn their rear dead-points, the jaws are opened and the completed spike or nail is dropped.

The shaft D is placed across the main frame, below and parallel to the shaft B. It is driven by a pinion, D¹, meshing into and of the same size as the pinion B¹.

To the end of this shaft, and below the crank B², is secured the crank D², fig. 2, which gives motion to the pitman D³, attached to the oscillating crank-arm D⁴ on the over-hung end of the oscillating shaft D⁵, being in bearings attached to the main frame.

On this shaft within the frame are two oscillating arms, D⁶, fig. 6, which give a vertically-reciprocating motion to the two connecting-rods D⁷, which operate the shears E E¹, to which they are respectively pivoted.

The form of the shear-plates is clearly shown in fig. 5. They are pivoted to a wrist-pin projecting from the cross-piece A², a part of the main frame at e, so as to oscillate on that pivot as a center with the vertically-reciprocating movement of the rods D⁷.

The shear-edged cutting-plates E² E³ are attached to the lower angles of the shear-plates E E¹, and placed in such relation to one another as to cut the spike or nail from the rod as it is carried between their shearing-edges and while held by the two sets of rolls.

F is a spur-wheel turning upon a stud-pin projecting from the main frame. It is formed with a hub on its outer face, at the center, to form a support for the ratchet-wheel F¹, which is formed with two sets of ratchet-teeth, one on the fact at f, the other upon the edge at f¹, the latter being intended to receive a pawl (not shown) to prevent the wheel from moving except in one direction, and the former being intended to receive the reciprocating catch f².

This catch is beveled upon its point to correspond with the inclined faces of the teeth f, like the ordinary catch of a mortise lock. This catch is placed in a chamber in the end of the oscillating arm F², which turns upon the projecting stud-pin which passes through the spur-wheel F.

A spring, fastened at one end to the arm F², presses against the catch f², forcing it against the teeth f, so as to engage it with the notches at the end of said teeth, and to yield to the force of the inclined plane, forming the face of said teeth as the arm moves in the opposite direction.

The arm F² is caused to oscillate upon its centrally-placed pivot by the reciprocating movement of a connecting-rod, F³, operated by a wrist-pin on the pinion D¹. This connecting-rod is adjustably attached by a slot and set-screw, so that the arm of the bar F², to which it is attached, may be made longer or shorter to regulate the movement of the nail-rod so as to insure its being cut at the proper point.

The oscillation of the arm F² communicates an intermitting revolution to the ratchet-wheel F¹, and, as the latter is bolted to the pinion F, to it also. The ratchet-wheel may be cast with the pinion F, but I prefer to make it separate, so that it may be renewed when it becomes worn from use.

The pinion F communicates a like intermittent motion to the pinion F⁵, on the end of the shaft G¹, and through it to the pinion F⁶ on the shaft G².

Two idle wheels, F⁴ and F⁷, turning upon stud-pins G and G⁵, respectively mesh into the pinions F⁵ and F⁹, and also into the pinions F⁶ and F⁸.

By the introduction of these idle wheels, the shafts G¹ and G³ are caused to revolve with the same intermittent motion and in the same direction, while the shafts G² and G⁴ are caused to revolve in like manner in the same direction with one another, but in a direction opposite to that of the shafts G¹ and G³.

The shafts G¹ and G², figs. 5 and 6, have their bearings in the exterior of frame A, and internally in boxes attached to the cross-beams A¹ and A⁷, fig. 6, inserted into and extending across the frame A. The shafts G³ and G⁴ have their bearings in like manner in boxes in the main frame, and attached to similar cross-beams A² and A⁸.

The shafts G¹ and G², respectively, carry the matrix or mold-wheels H¹ and H. These wheels are disks of cast-iron, cast with an annular recess in each of their edges. This recess is formed by a chill, of proper shape to leave the faces at the bottom of the recess with a series of eccentric surfaces of the proper form to approximate to the shape of the nails or spikes which are formed by compression upon a heated bar passing between the wheels, so that with the revolution of the wheels a number of blank spikes or nails may be formed at each revolution. These wheels are chilled at their operating edges, to give the requisite hardness to enable them to perform their work, and so that they may not be rapidly worn away from use. I prefer the chilled matrices to steel, both because they are cheaper and because they are less affected by the heat.

The finishing-wheels H² and H³ are disks of steel, between the edges of which the nails or spikes are carried, and which are formed so as to give the required shape to the spikes or nails when finished. They are fastened to the shafts G³ and G⁴, and are arranged to receive the nail or spike-blank after it has been delivered from the wheels H H¹, and been cut from the rod by the action of the shears.

The nail or spike, while passing between the finishing-wheels H² H³, is held between the jaws C³ C⁴, which are arranged on each side of the said wheels at their nearest point, and which clutch such nail or spike the instant it is cut from the bar by the shears, and by the motion of the jaws and frame draw the nail or spike between the wheels H³ H⁴ in the direction of their revolution, but at a faster rate of movement than would be determined by the action of the wheels alone. This is effected by the proportions and arrangement of the operating mechanism, which is so regulated that the movement of the jaws shall be faster than that of the peripheries of said wheels.

The object of this is to draw the nail or spike between the polished surfaces of the finishing-wheels, so as to smooth it and prevent the formation of fins or irregularities which impair the value of the product.

The nail or spike, in passing from the wheels H H¹, passes through the guide I, which is a hole in a plate, I¹, fastened between the boxes of the shafts G¹ G², and opposite the point of junction of the wheels H H¹.

The same polishing effect will be produced by causing the nail to move more slowly than the rolls; but the arrangement described is for many reasons preferable.

The disks H² H³, when new, are made with their bearing-surfaces, say an inch longer than the nail to be manufactured, so that they can be ground down as they become dulled, and thus made to last longer in service. When worn out so as to be unfit for service on a nail of one length, they may be transferred to a machine making the next size shorter nails, and so they pass successively through the series.

It should be noted that the two cranks on shaft B have precisely the same length, but the crank B² is set at, say, one-eighth of an inch forward of the other crank, so as to give action to the arm B⁷ a little in advance, in point of time, of the action of the cross-heads carrying the jaws.

Streams of cold water will be poured upon the rods to reduce their temperature, and in an operating machine a heavy fly-wheel should be attached to carry the mechanism past the point of greatest resistance.

I have illustrated a machine with two sets of rolls, but the number of sets may be increased so that the nail may be subjected to their successive action.

The mode of operating this machine is as follows:

The bars or rods from which the nails or spikes are to be cut, having been heated, are fed to the machine through the slot shown in the cross-head $C^5$ in fig. 6, and enter between the wheels $H\ H^1$; the matrix or mold-grooves compressing the bar, will swage it into sections corresponding to the general form or outline of the nails or spikes to be made.

Different-sized wheels will, of course, be used according to the size of the nails or spikes to be manufactured, and to permit the substitution of different sets of wheels, one for the other, the bearings are so arranged in the frame A that wheels of different diameters may be used and the bearings approached or set farther apart as required.

The rod, passing beyond the wheels $H\ H^1$, will enter the guide I, and when the proper length has been projected, the action of the wheels $H\ H^1$ will be stopped, and the blank cut from the rod by the shears, while the rod is held between the two sets of rolls, and immediately afterward be griped by the jaws and passed between the finishing-wheels.

These complete it, forming the head and all other parts of a completed nail or spike, and at the same time the more rapid action of the jaws will, as already explained, draw the nail or spike between the disks of the finishing-wheels, and polish its surface by the friction of said smooth surfaces.

When the nail or spike has thus been finished, it will be carried by the jaws beyond the finishing rolls, and then, by the action of the cam, the jaws will be opened and the spike dropped.

The arrangement of the mechanism is such that while the jaws are being brought back the wheels will be stationary and also the shears. The instant the shears cut the rod the blank is seized by the jaws and carried forward between the finishing-wheels, the first set of wheels $H\ H^1$ will be feeding forward another blank.

What I claim, and desire to secure by Letters Patent, is—

1. The combination of the two sets of matrix rolls $H\ H^1$ and $H^2\ H^3$, respectively, constructed substantially as set forth, with the intermediate guide and clamping-jaws, substantially as described and shown.

2. The combination of the rolls $H^2\ H^3$, the holding-jaws $C^3\ C^4$, and mechanism to reciprocate the latter with either greater or lesser velocity than that given to the dies on the rolls, substantially as and for the purpose set forth.

3. In combination with the driving-shaft and movable jaw, the parts $B^3\ B^4\ B^5\ B^6\ B^7$ and $C^1$, constructed and arranged to operate substantially as set forth.

4. In combination with the rolls $H^2$ and $H^3$, the cross-heads C and $C^5$, bars $C^1$ and $C^2$, and jaws $C^3$ and $C^4$, arranged to operate substantially as set forth.

5. In combination with the shear-plates $E\ E^1$, constructed and pivoted substantially as described, the connecting-rods $D^7$, arms $D^6$, and oscillating-shaft $D^5$, substantially as set forth.

6. In combination with the two pairs of matrix rolls and their operating mechanism, the spur-pinion F, ratchet-wheel $F^1$, catch $f^2$, and oscillating arm $F^4$, substantially as set forth.

7. In combination with the crank, pitman, and frame carrying the jaws, the crank $B^2$, pitman, and eccentric, when said cranks are constructed and arranged to operate substantially as set forth.

In testimony whereof, I have signed my name to this specification in the presence of two subscribing witnesses.

THO. WOOD.

Witnesses:
R. MASON,
D. P. HOLLOWAY.